United States Patent
Diebold et al.

(10) Patent No.: US 7,430,051 B2
(45) Date of Patent: Sep. 30, 2008

(54) METHODS FOR CHARACTERIZING SEMICONDUCTOR MATERIAL USING OPTICAL METROLOGY

(75) Inventors: Alain Charles Diebold, Austin, TX (US); James Martin Price, Austin, TX (US)

(73) Assignee: Sematech Inc., Austin, TX (US)

( * ) Notice: Subject to any disclaimer, the term of this patent is extended or adjusted under 35 U.S.C. 154(b) by 321 days.

(21) Appl. No.: 11/249,175

(22) Filed: Oct. 12, 2005

(65) Prior Publication Data

US 2007/0081169 A1 Apr. 12, 2007

(51) Int. Cl.
G01B 11/14 (2006.01)

(52) U.S. Cl. .................... 356/625; 356/369; 356/445

(58) Field of Classification Search ............ 356/369, 356/601, 625, 626, 630, 636, 445
See application file for complete search history.

(56) References Cited

U.S. PATENT DOCUMENTS

| | | | |
|---|---|---|---|
| 5,796,983 A | 8/1998 | Herzinger et al. | 703/2 |
| 5,864,633 A | 1/1999 | Opsal et al. | 382/141 |
| 5,907,401 A | 5/1999 | Clarke et al. | 356/451 |
| 5,963,329 A | 10/1999 | Conrad et al. | 356/613 |
| 6,465,265 B2 | 10/2002 | Opsal et al. | 438/16 |
| 6,590,656 B2 * | 7/2003 | Xu et al. | 356/369 |
| 6,785,638 B2 | 8/2004 | Niu et al. | 702/189 |
| 6,934,900 B1 | 8/2005 | Cheng et al. | 714/738 |
| 7,173,699 B2 * | 2/2007 | Xu et al. | 356/369 |
| 2002/0033945 A1 * | 3/2002 | Xu et al. | 356/369 |
| 2002/0045282 A1 | 4/2002 | Opsal et al. | 438/16 |
| 2003/0058443 A1 * | 3/2003 | Xu et al. | 356/369 |
| 2004/0220760 A1 | 11/2004 | Niu et al. | 702/76 |
| 2004/0257566 A1 | 12/2004 | Chism | 356/369 |
| 2005/0248773 A1 * | 11/2005 | Rosencwaig | 356/504 |

FOREIGN PATENT DOCUMENTS

| | | |
|---|---|---|
| EP | 0710848 | 5/1996 |
| WO | WO 98/28606 | 7/1998 |
| WO | WO 9828606 A1 * | 7/1998 |
| WO | WO 99/02970 | 1/1999 |
| WO | WO 2004/107026 | 12/2004 |

OTHER PUBLICATIONS

Aspnes, "The analysis of opitical spectra by fourier methods," *Surface Science*, 135:284-306, 1983.

Edwards et al., "Optical characterization of wide bandgap semiconductors," *Thin Solid Films*, 364:98-106, 2000.

PCT International Search Report, dated Oct. 18, 2006.

Sanders and Chang, "Theory of optical properties of quantum wires in porous silicon," *Phys. Rev. B.*, 45:9202, 1992.

(Continued)

*Primary Examiner*—Roy M Punnoose
(74) *Attorney, Agent, or Firm*—Fulbright & Jaworski LLP (57) ABSTRACT

Methods for characterizing a semiconductor material using optical metrology are disclosed. In one respect, a electromagnetic radiation source may be directed in a direction substantially parallel to patterns on a semiconductor material. A polarized spectroscopic reflectivity may be obtained, and a critical point data may be determined. Using the critical point data, physical dimensions of the patterns may be determined. In other respects, using optical metrology techniques, a critical point data relating to electron mobility may be determined.

7 Claims, 4 Drawing Sheets

OTHER PUBLICATIONS

Yoo and Aspnes, "Elimination of endpoint-discontinuity artifacts in the analysis of spectra in reciprocal space," *J. Appl. Phys.*, 89:8183-8192, 2001.

Yoo et al., "Analysis of optical spectra by Fourier methods," *Thin Solid Films*, 313-314:143-148, 1998.

Yoo et al., "High-resolution spectroscopy with reciprocal-space analysis: application to isotopically pure Si," *Physica Status Solidi B*, 220:117-125, 2000.

Zhao et al., "Quantum Confinement and Electronic Properties of Silicon Nanowires," *Phys. Rev. Lett.*, 92:236805, 2004.

Karrer et al., "Optical Properties of Cl-Doped ZnSe Epilayers Grown on GaAs Substrates," *J. Elect. Mat.*, 34:944-948, 2005.

PCT Invitation to Pay Additional Fees, dated Feb. 21, 2007.

Gavrilenko et al., "Electroreflectance spectra of thin silicon films," *Thin Solid Films*, 37:201-206, 1976.

PCT International Search Report and Written Opinion, issued in International Application No. PCT/US2006/040262, dated May 10, 2007.

* cited by examiner

METHODS FOR CHARACTERIZING SEMICONDUCTOR MATERIAL USING OPTICAL METROLOGY

This application incorporates by reference pending U.S. patent application Ser. No. 11/179,357 entitled "Methods and Systems for Characterizing Semiconductor Materials" by James M. Price, which was filed on Jul. 12, 2005.

BACKGROUND OF THE INVENTION

1. Field of the Invention

The present invention relates generally to characterizing semiconductor materials. More particularly, the present invention involves optical metrology techniques used to determining physical dimensions of a patterned semiconductor material.

2. Description of Related Art

Current integrated circuit (IC) manufacturing processes employ bulk silicon substrates for the fabrication of semiconductor devices. During the manufacturing process, in-line metrology techniques such as spectroscopic ellipsometry (SE) and reflectometry may be used to determine the properties of the substrate. Using these techniques and certain characteristics of the silicon substrate, for example, the optical properties of the substrate, and parameters such as thickness and refractive index of the layers deposited on the silicon substrate may be determined. In most cases, the optical constants are parameterized in some form of an oscillator model or other useful optical model.

Spectroscopic ellipsometry and reflectivity may be used to measure critical dimensions (CD) for lithographic processing of three-dimensional (3D) test structures and lines. These techniques are know as scatterometry and provide a means for determining line height, width, sidewall angle, pitch, and the like from a plurality of parallel lines. Currently, library based scatterometry solutions are developed to analyze scatterometry data and determine line width and shape. Typical library based scatterometry solutions are developed by solving Maxwell's equations and generating different spectral (either reflectivity curves or ellipsometry curves) responses. The measured data of a test structure is then matched to a particular library and the physical dimensions of the test structure are interpolated between the two closest simulated curves. However, Maxwell's equations are the classical solution to electromagnetic wave propagation through a dispersive medium and the dielectric function (optical properties, n, and k) is assumed to remain constant for any physical dimensions. As such, the change in the dielectric function due to quantum confinement is not accounted for.

Any shortcoming mentioned above is not intended to be exhaustive, but rather is among many that tends to impair the effectiveness of previously known techniques for characterizing substrates; however, shortcomings mentioned here are sufficient to demonstrate that the methodologies appearing in the art have not been satisfactory and that a significant need exists for the techniques described and claimed in this disclosure.

SUMMARY OF THE INVENTION

The present disclosure provides techniques for characterizing critical dimensions. Particularly, scatterometry or ellipsometry techniques are provided for considering corrections to optical properties due to quantum confinement. In particular, a library based approach in which the dimensions of the test structure are a function of the increase in energy for the band gap may be used. Test structures data, e.g., reflectivity data from a semiconductor material may be analyzed and compared with the pre-simulated data of the library.

In one respect, a method for characterizing critical dimensions, e.g., physical dimensions of a plurality of lines on a semiconductor material is disclosed. Using optical metrology techniques, such as, but not limited to scatterometry or ellipsometry techniques, a polarized spectroscopic reflectivity in a direction of scatter of the semiconductor material is obtained. In one embodiment, the semiconductor material may be illuminated with an electromagnetic radiation source directed in a direction substantially parallel to the plurality of lines. A reflective light due to the illumination step may be obtained.

Using the reflective light, a critical point data may be determined using the polarized spectroscopic reflectivity, and from the critical point data, the plurality of lines may be characterized. In one embodiment, a reflectivity curve may be generated and may be compared to pre-simulated reflectivity curves stored in a library. The pre-simulated curves may be solutions of Schrödinger's equation, which identifies the physical dimensions of a line. For example, the Schrödinger's equation may be solved using Cartesian coordinates for rectangular shaped lines. Alternatively the Schrödinger's equation may be solved using polar coordinates for cylindrical lines.

In other respects, optical metrology may be used to determine electron mobility in a semiconductor material. In one embodiment, a plurality of voltages may be applied to a semiconductor material. Using optical metrology techniques, for each voltage applied, a polarized reflectivity may be measured, and a critical point data may be determined based on the all the polarized reflectivity measured. From the critical point data, which may include, for example, a critical point energy, the electron mobility may be determined.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The figures are examples only. They do not limit the scope of the invention.

DESCRIPTION OF ILLUSTRATIVE EMBODIMENTS

The disclosure and the various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

The present disclosure provides for determining the critical points of a device under test, such as, but not limited to a semiconductor material. In particular, the present disclosure provides technique to identify quantum confined induced differences in the scatterometry measurements independent of a user defined model or initial/prior knowledge of the optical properties. Critical point measurements determined from the scatterometry measurements may be used to characterize the critical dimensions and in particular, physical dimensions of lines on the semiconductor material may be determined. Additionally, the critical point measurements may be used to determine electron mobility in a channel region of transistors on the substrate.

Determining Critical Point Parameters

The critical point parameters, as disclosed in pending U.S. patent application Ser. No. 11/179,357 and incorporated herein by reference in its entirety, involves characterizing quantum mechanical properties seen in semiconductor materials, particularly thin substrates (having about or less than approximately 10 nanometers). For example, the band edge energy shift can affect the electrical and optical response of a silicon layer in substrates such as, but not limited to, silicon-on-insulator (SOI) substrates, strained silicon-on-insulator (sSOI) substrates, silicon-germanium-on-insulator (GeOI) substrates, and strained silicon-germanium-on-insulator (sGeOI) substrates. Generally, a quantum confined layer may be a thin film regime, where the thickness is less than approximately 10 nanometers and the top layer may be a silicon layer. The quantum confined layer may be realized as a quantum well with a barrier width substantially equal to the silicon thickness, an electron potential trap due to the buried oxide layer band gap of approximately 9.0 electron Volts (eV), and an infinite potential barrier due to air. Quantum mechanics dictate that for such a model, the electron has quantized energy eigenstates as follows:

$$\Delta E = \frac{(\pi \hbar)^2}{2m \ast L^2} \qquad \text{Eq. 1}$$

where E is the photon energy, L is the thickness of the semiconductor material, m is an effective mass of a confined electron, and $\hbar$ is Planck's constant. As seen from Eq. 1, the quantization effects increase with decreasing silicon thickness.

In addition to the discrete energy state, the corresponding electron joint density-of-states (JDOS) has an energy dependent function form change. The JDOS for a 3D (bulk) electron, $\rho(E)$, with excitation energies centered at a critical point $E_g$ is as follows:

$$\rho(E) \propto (E - E_g)^{\frac{1}{2}} \qquad \text{Eq. 2}$$

For a 2D confined electron, the density of state (DOS) is:

$$\rho(E) \propto \Theta(E - E_g) \qquad \text{Eq. 3}$$

where $\Theta$ is the Heaviside step function. The JDOS is proportional to the imaginary part of the dielectric function, and therefore, shows that quantum confinement effects also change the shape of absorption around critical point energies. With a decrease in the dimensionality of the semiconductor material, the absorption centered at a critical point changes from a parabolic shape to a piece-wise step function In one embodiment, the critical point parameters of the quantum confined layer may be determined. This step may be performed without knowing the chemical composition or thickness of other films, such as, but not limited to, native oxide, barrier layer, and the like, present. Using the critical point parameters, and in particular the energy difference between the critical points, where a first critical point parameter may be from a bulk three-dimensional silicon layer of the semiconductor material and a second critical point parameter may be from a confined silicon layer of the semiconductor material, physical dimensions of patterns on a semiconductor material may be determined.

It is known how the optical properties change around semiconductor critical points due to dimensional confinement. In addition, these changes are extremely sensitive to the polarization state of the incident photons:

$$\varepsilon(\omega) = 1 + \left( \frac{q^2 |\langle \phi_c | \vec{r} \cdot \hat{e} | \phi_v \rangle|^2}{\pi^2} \right) \int \left[ \frac{d^3 k}{(\hbar \omega - E_{cv}(k) - i\hbar \Gamma)} \right] \qquad \text{Eq. 4}$$

where $\hat{e}$ is the unit polarization vector and is seen to only interact in the direction parallel to the electron momentum, $\epsilon$ is the dielectric function, q is the electronic charge, $\vec{r}$ is the electron momentum vector, $\phi_v$ and $\phi_c$ is the wave function for the valence and conduction bands, respectively, $\hbar\omega$ is the incident photon energy, $E_{cv}$ is the band gap, k is a wave vector, $\omega$ is n angular frequency, $\hbar$ is Planck's constant, and $\Gamma$ is the lifetime broadening term. However, if in a confined structure, such as a silicon nanowire, the optical response would be anisotropic and the difference in the two polarization signals would be non-zero around the critical points. Characterization of these differences around the critical points will yield certain physical information about the test structure being measured.

Characterizing a Semiconductor Material

In one embodiment, optical properties using a scatterometry simulation software may be determined on a semiconductor material with a periodic grating. Testing for a variety of widths and heights may determine if optical metrology such as scatterometry is sensitive to changes in the optical properties. In one embodiment, the simulation may generate an s- and p-reflectivity spectrum data corresponding to the above exemplary height and width. A p-polarized light may be provided in a direction parallel to the periodic grating and an s-polarized light in a direction perpendicular to the plurality of lines. Alternatively, the p-polarized light may be provided in a direction perpendicular to the periodic grating and an s-polarized light in a direction parallel to the periodic grating. As known in the art, the s- and p-polarized light may be from, for example, an electromagnetic radiation light source and defined as the electromagnetic wave amplitude propagating perpendicular or parallel to the plane of incidence, respectively.

In embodiments where both an s- and p-reflectivity spectrums are obtained, the spectrums may need to be separated to observe the change in the critical point of the semiconductor material. For example, in one embodiment, the reflectivity spectrum from the polarized light directed in a direction substantially parallel to the periodic gratings of the test structure may be separated with techniques known in the art and may be used to characterize the semiconductor material.

Alternatively, in other embodiments, only the reflectivity spectrum generated from a polarized light, e.g., an electromagnetic source directed in a direction substantially parallel to the periodic gratings of the test structure may be obtained and used to determine the physical dimensions of the periodic gratings. For example, referring to FIG. 1, electromagnetic source 100 may illuminate semiconductor material 102 in a direction substantially parallel to the patterns on semiconductor material 102. The reflective light from semiconductor material 102 may be received by detector 104 and analyzed by processor 106. Coupled to processor 106 may be library 108, which may include, among other things, pre-simulated data that may be compared to data extracted from the reflective light. The generation of these pre-simulated data is discussed in more detail below.

Figure 1:
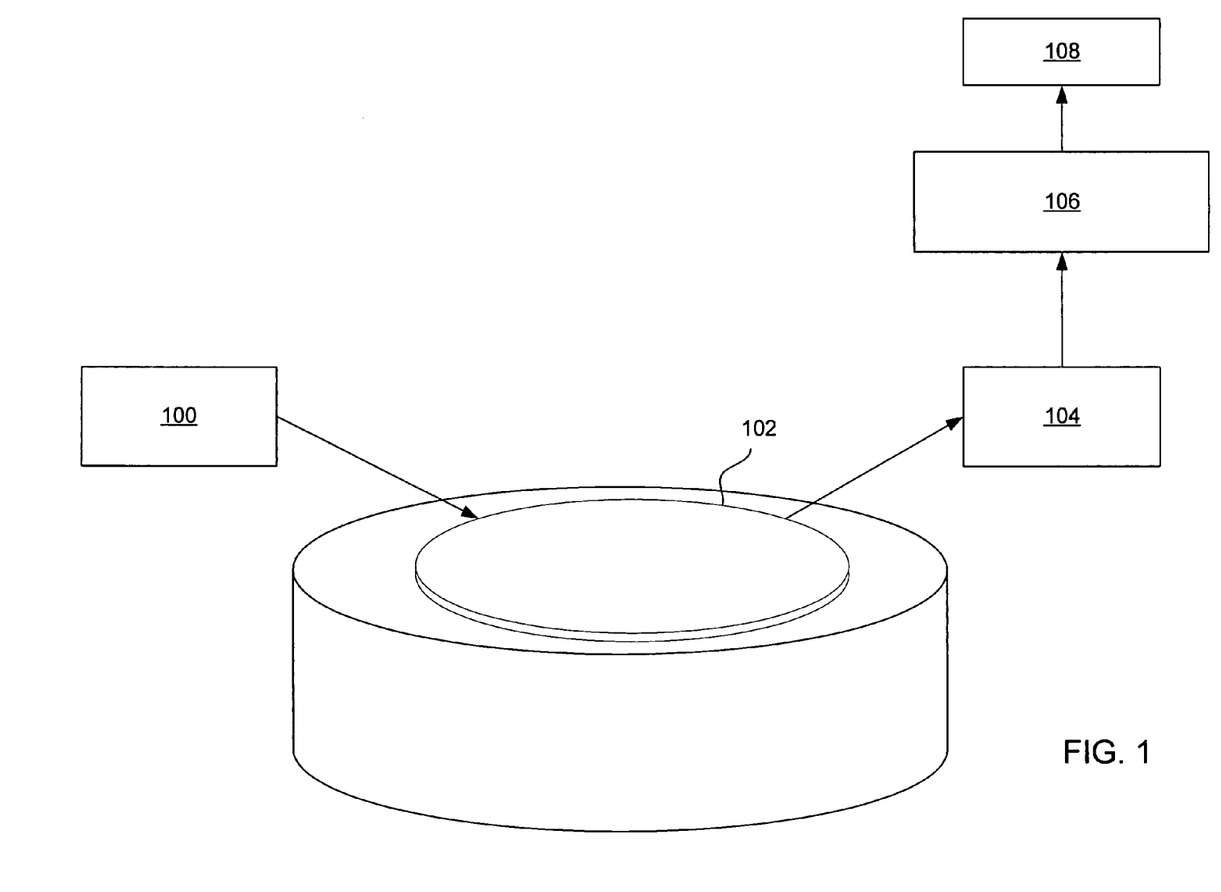
FIG. 1 is a system for determining physical dimensions of patterns on a semiconductor material, in accordance with embodiments of this disclosure.

Library 108 may be integrated with processor 106, where processor 106 and 108 are a single processing unit. Alternatively, library 108 may be at a remote location and may be accessed via network connections, the Internet, or other similar data connection links known in the art.

Figure 2:
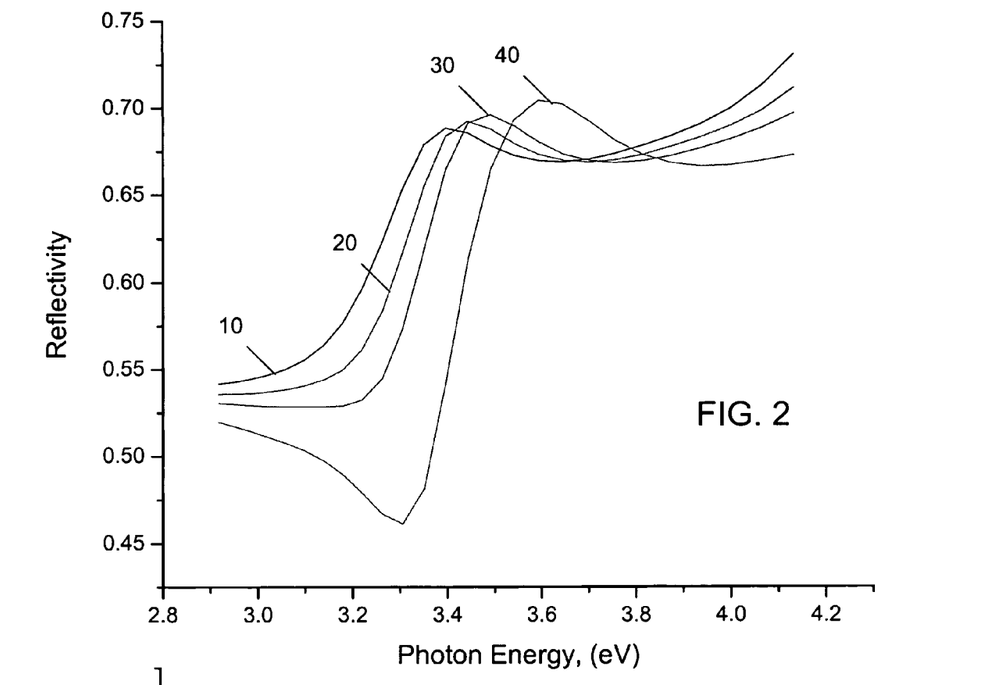
FIG. 2 is a graph showing the reflectivity curves of a polarized light in a direction substantially parallel to a periodic grating of a plurality of lines, in accordance with embodiments of this disclosure.
Figure 3:
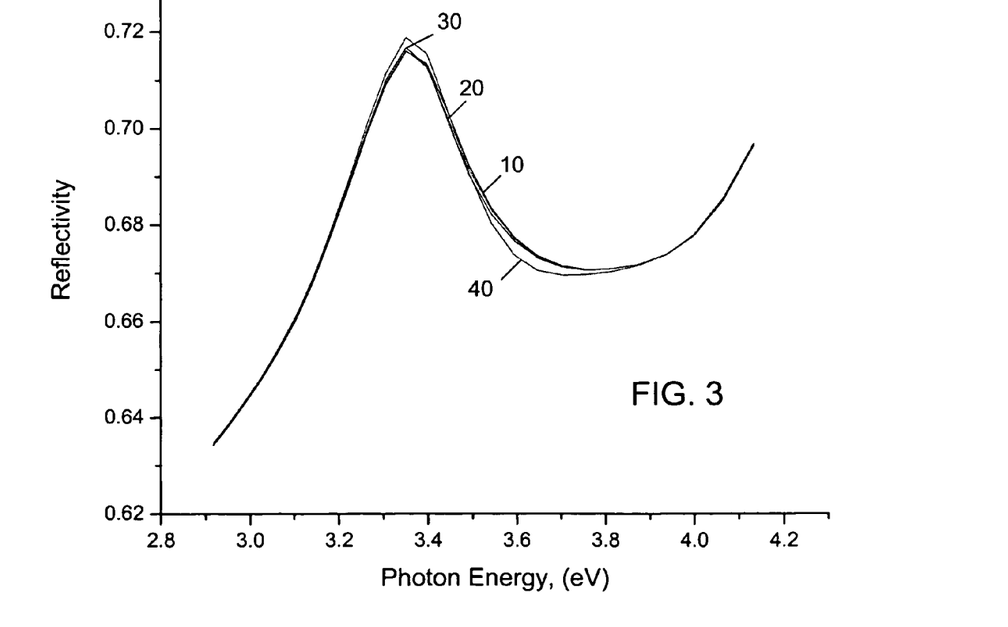
FIG. 3 is a graph showing the reflectivity curves of a polarized light in a direction substantially perpendicular to a periodic grating of a plurality of lines, in accordance with embodiments of this disclosure.

Library 108 may be any computer-readable media known in the art. For example, it may be embodied internally or externally on a hard drive, ASIC, CD drive, DVD drive, tape drive, floppy drive, network drive, flash, or the like. Processor 106 is meant to indicate any computing device capable of executing instructions for receiving the data from, for example, the detector and amongst other functions, may implement the steps of generating reflective data similar to the graphs shown in FIGS. 2 and/or 3. In one embodiment, processor 106 is a personal computer (e.g., a typical desktop or laptop computer operated by a user). In another embodiment, processor may be a personal digital assistant (PDA) or other handheld computing device.

In some embodiments, processor 106 may be a networked device and may constitute a terminal device running software from a remote server, wired or wirelessly. Input from a user, detector 104, or other system components, may be gathered through one or more known techniques such as a keyboard and/or mouse. Output, if necessary, may be achieved through one or more known techniques such as an output file, printer, facsimile, e-mail, web-posting, or the like. Storage may be achieved internally and/or externally and may include, for example, a hard drive, CD drive, DVD drive, tape drive, floppy drive, network drive, flash, or the like. Processor 106 may use any type of monitor or screen known in the art, for displaying information, such as but not limited to, figures similar to FIGS. 2 and 3. For example, a cathode ray tube (CRT) or liquid crystal display (LCD) can be used. One or more display panels may also constitute a display. In other embodiments, a traditional display may not be required, and processor 106 may operate through appropriate voice and/or key commands.

In one embodiment, processor 106 may generate a reflectivity curve as a function of photon wavelength or photon energy (similar to the graph shown in FIG. 2) for the reflective light received by detector 104. Processor 106 may also compare the graph to pre-simulated data stored in library 108, which is coupled to processor 106 for determining physical dimensions of the patterns on semiconductor material 102. Library 108 may include pre-simulated data stored in a read-only-memory (ROM). Alternatively, those of ordinary skill in the art will recognize that pre-simulated data may be stored on the hard drive of processor 106, on a different removable type of memory, or in a random-access memory (RAM). The pre-simulated data may also be stored for example, on a computer file, a software package, a hard drive, a FLASH device, a floppy disk, a tape, a CD-ROM, a DVD, a hole-punched card, an instrument, an ASIC, firmware, a "plug-in" for other software, web-based applications, or any combination of the above.

Figure 4:
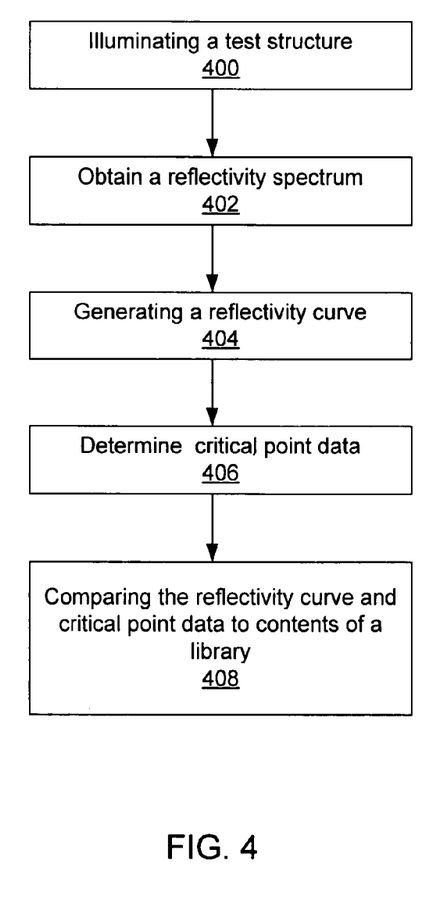
FIG. 4 is a flowchart of a method for determining physical dimensions of patterns on a semiconductor material, in accordance with embodiments of this disclosure.

In one embodiment, referring to FIG. 4, a method for determining physical dimensions of patterns on a test structure is shown. In step 400, a test structure, may be illuminated using optical metrology techniques such as ellipsometry or scatterometry. The test structure may be a semiconductor material such as, but not limited to, silicon-on-insulator (SOI) substrates, strained silicon-on-insulator (sSOI) substrates, silicon-germanium-on-insulator (GeOI) substrates, and strained silicon-germanium-on-insulator (sGeOI) substrates. In one embodiment, an electromagnetic radiation source may be directed along the direction of the pattern on the test structure, i.e., parallel to the patterns of the test structure.

The illumination of the test structure may provide a polarized spectroscopic reflectivity (step 402). The polarized spectroscopic reflectivity may be either a s-reflectivity spectrum or a p-reflectivity spectrum. Alternatively, the reflectivity spectrum may be Psi or Delta. Using the reflectivity spectrum, a reflectivity curve, similar to the curves shown in FIG. 2, may be generated (step 404). The reflectivity curve may be a function of photon wavelength. Alternatively, the reflectivity curve may be a function of photon energy.

From the curves, a critical point may be determined (step 406). In one embodiment, the critical point may be derived from electronic transitions between different bands of the layers of a test structure. In step 408, the critical point from the reflectivity curves may then be compared with pre-simulated data stored in a library (such as library 108 of FIG. 1). In one embodiment, the pre-simulated data stored in the library may be generated from a solution to Schrödinger's equation. Details of the solution is discussed in more details below.

In general, when quantum confinement is an issue, light polarized perpendicular to the periodic gratings produces a substantially uniform curve, and thus, may not be able to provide information relating to the critical points and/or physical dimensions of the periodic gratings. Light polarized along the direction of the periodic grating scatters from the semiconductor material below, and thus, allows for changes to be observed. For example, referring to FIG. 2, changes in the s-polarized reflectivity curves with a shift in the critical points of the silicon dielectric function may be seen, where an s-polarized light was directed in a direction substantially parallel to the periodic grating. Line graph 10 corresponds to the optical properties from a thin, planar bulk silicon on insulator (SOI) substrate. Line graph 20 corresponds to the change in optical properties of a thin film, which may be associated with silicon lines of an SOI substrate with an approximate thickness of about 8 nanometers. Line graph 30 corresponds to the change in optical properties of a thin film, which may be associated with silicon lines of an SOI substrate with an approximate thickness of about 4 nanometers. Line graph 40 corresponds to the change in optical properties of a thin film, which may be associated with silicon lines of an SOI substrate with an approximate thickness of about 2 nanometers. As shown in FIG. 2, the reflectivity data is sensitive to the type and thickness of a substrate, and thus, may allow for critical point data to be extracted.

In comparison, reflectivity curves for the p-polarized reflectivity light of different substrates are shown in FIG. 3. The reflectivity curves may be from a light directed in a direction parallel to a periodic grating of a semiconductor material. FIG. 3 shows that regardless of the type and thickness of a substrate, the reflectivity curves are similar, and thus, are not sensitive to changes in the critical point data.

In other embodiments, using ellipsometry data, particularly Psi and Delta, differences in the physical dimensions may be determined, and subsequently, may allow for the critical points to be determined. This may be possible given the following relationship:

$$\frac{\tilde{R}_P}{\tilde{R}_S} = \mathrm{Tan}\psi e^{i\Delta} \qquad \text{Eq. 5}$$

where $R_p$ and $R_s$ are the complex reflectivity's for P-polarized and S-polarized light, respectively. Psi ($\psi$) is the change in amplitude of the polarization, and Delta ($\Delta$) is the change in phase of the polarization upon reflection.

Populating a Library

Using, for example, a scatterometry or ellipsometry simulation software, simulated reflectivity signals may be generated and stored in library, such as library 108 of FIG. 1 for comparison with data from a test structure. The comparison may generate information regarding, for example, a line width and/or height.

In one embodiment, to accurately account for quantum mechanical induced changes in the dielectric function, Schrödinger's equation may be solved. The corresponding energy Eigen state solutions of this equation provide the allowed energies the electron may have. This also predicts the quantization of energy and the integer increase due to dimensional confinement.

In one embodiment, a library may be generated by solving Schrodinger's equation:

$$\frac{-\hbar^2}{2m}\nabla^2 \psi(\vec{r}) + V(\vec{r})\psi(\vec{r}) = E\psi(\vec{r}) \qquad \text{Eq. 6}$$

where $\hbar$ is Planck's constant, m is the mass of the electron, $\nabla^2$ is the Laplacian operator, $\psi(\vec{r})$ is the electron wave function in general coordinates, V is the potential, and E is the energy. The above equation is solved by applying the correct boundary conditions. In one embodiment, the boundary conditions may be the dimensions of multiple critical dimensions. For example, the dimensions may include the height, width, diameter, sidewall angle, and the like. The solution for the allowed energy eigen states may be a function of the dimensions. Thus, the library may be generated for various values of different dimensions yielding different band gap energy increases.

For periodic gratings with rectangular dimensions, Schrödinger's equation may be solved using Cartesian coordinates (x,y,z) as follows:

$$\frac{-\hbar^2}{2m}\left(\frac{\partial^2}{\partial x^2} + \frac{\partial^2}{\partial y^2} + \frac{\partial^2}{\partial z^2}\right)\psi(x, y, z) + V(x, y, z)\psi(x, y, z) = E\psi(x, y, z) \qquad \text{Eq. 7}$$

where the energy solutions are:

$$E_{x,y} = \frac{\hbar^2 \pi^2}{2m}\left(\frac{1}{a^2} + \frac{1}{b^2}\right) \qquad \text{Eq. 8}$$

(a is the length of the line and b is the width of the line). To populate the library, multiple line widths and heights may be used to find $E_{x,y}$. As such, upon receiving measurements from a test structure, for example, receiving reflectivity data from a reflectivity spectrum from a polarized light in a direction substantially parallel to the patterns on the test structure. Graphs, similar to FIG. 2, may show the photon energy which can compared to the pre-simulated $E_{x,y}$ to determine a and b, the length and width of the lines of the test structure.

In one embodiment, a critical point is related the electronic transitions between different bands of a semiconductor. These electronic transitions are labeled E0, E1, E1+$\Delta$1, E2, etc. For bulk silicon, the fundamental absorption edge, or the direct band gap, is at the E1 critical point and experimentally and theoretically shown to lie at about 3.4 eV. To determine what photon energy range to focus on in order to obtain a critical point, the electronic transitions for the semiconductor and what energies those critical points occupy must be first obtained.

To determine the critical point energies and other parameters such as amplitude and broadening, one method would be to use the reciprocal space analysis as described in pending U.S. patent application Ser. No. 11/179,357. Assuming the critical point has a Lorentzian shape, one Fourier transforms the data and looks at the corresponding Fourier coefficients. The slope of the phase of the Fourier coefficients plotted versus index will yield the band gap, i.e. critical point energy. In other embodiments, critical point parameters may be determined by fitting a Lorentzian lineshape to the spectra using a least squares regression technique.

For periodic gratings with cylindrical dimensions, Schrödinger's equation may be solved using polar coordinates (r, $\theta$) as follows:

$$\frac{-\hbar^2}{2m}\left(\frac{\partial^2}{\partial r^2} + \frac{1}{r}\frac{\partial}{\partial r} + \frac{1}{r^2}\frac{\partial^2}{\partial \theta^2}\right)\psi(r, \theta) + V(r, \theta)\psi(r, \theta) = E\psi(r, \theta) \qquad \text{Eq. 9}$$

where the energy solution is:

$$E_{n,l} = \frac{\hbar^2}{2ma^2}j_{l,n}^2 \qquad \text{Eq. 10}$$

where a is the diameter of the line, and the function j are the Bessel functions. For the ground state Bessel function:

$$j_{0,1} \approx 2.405 = 0.765\pi \qquad \text{Eq. 11}$$

Bessel functions, as known in the art, are solutions to second order ordinary differential equations of the type:

$$r^2 \frac{d^2 u}{dr^2} + r\frac{du}{dr} + [(kr)^2 - l^2]u = 0 \qquad \text{Eq. 12}$$

The state of lowest energy for an electron is termed the ground state. In order to determine where there is an increase in energy of the electrons, the minimal amount of increase due to quantum confinement can be at the ground state (n=0) of the Bessel function.

To populate the library, multiple diameters, a, may be calculated to determine $E_{n,l}$. Upon receiving measurements from a test structure, for example, receiving reflectivity light from a polarized light in a direction substantially parallel to the patterns on the test structure, and after generating a reflectivity curve, a critical point energy may be determined. The critical point energy may be compared to the pre-simulated data stored in the library, and a diameter of the line wire may be determined.

Electron Mobility

In other embodiments, thin wires of silicon may include cross-sectional area dependent mobilities. In particular, the mobilities can be dependent on the electric field driving carrier transport. As noted in U.S. patent Ser. No. 11/179,357, which is incorporated by reference in its entirety, Lorentzian functional forms and a Fourier transform method may be used to determine the critical point position from ellipsometric data. For a uniform applied electric field, the change in the imaginary part of the dielectric function centered on a two dimensional critical point at the fundamental absorption edge is:

$$\Delta \varepsilon_i = \frac{4\pi (m_x m_y)^{\frac{1}{2}}}{\omega^2} \left\{ Ai_1 \left[ \frac{(\omega_g - \omega)}{\theta} \right] - \Theta\left[ \frac{(-\omega_g - \omega)}{\theta} \right] \right\}, \qquad \text{Eq. 13}$$

$$\text{where } \theta = \left[\frac{E^2}{2\mu}\right]^{\frac{1}{3}}, \frac{1}{\mu} = \frac{1}{m_x} + \frac{1}{m_y} + \frac{1}{m_z}, Ai(\eta) = \int_0^\infty A_i(\eta + x) dx,$$

and Ai is the normalized Airy function that satisfies the second order homogeneous differential equation. In the above equations, $m_i$ is the effective masses in the $i^{th}$ direction (where i=x, y, z), w is the frequency of incident light, $w_g$ is a critical point energy, and E is the amplitude of the applied field.

Figure 5:
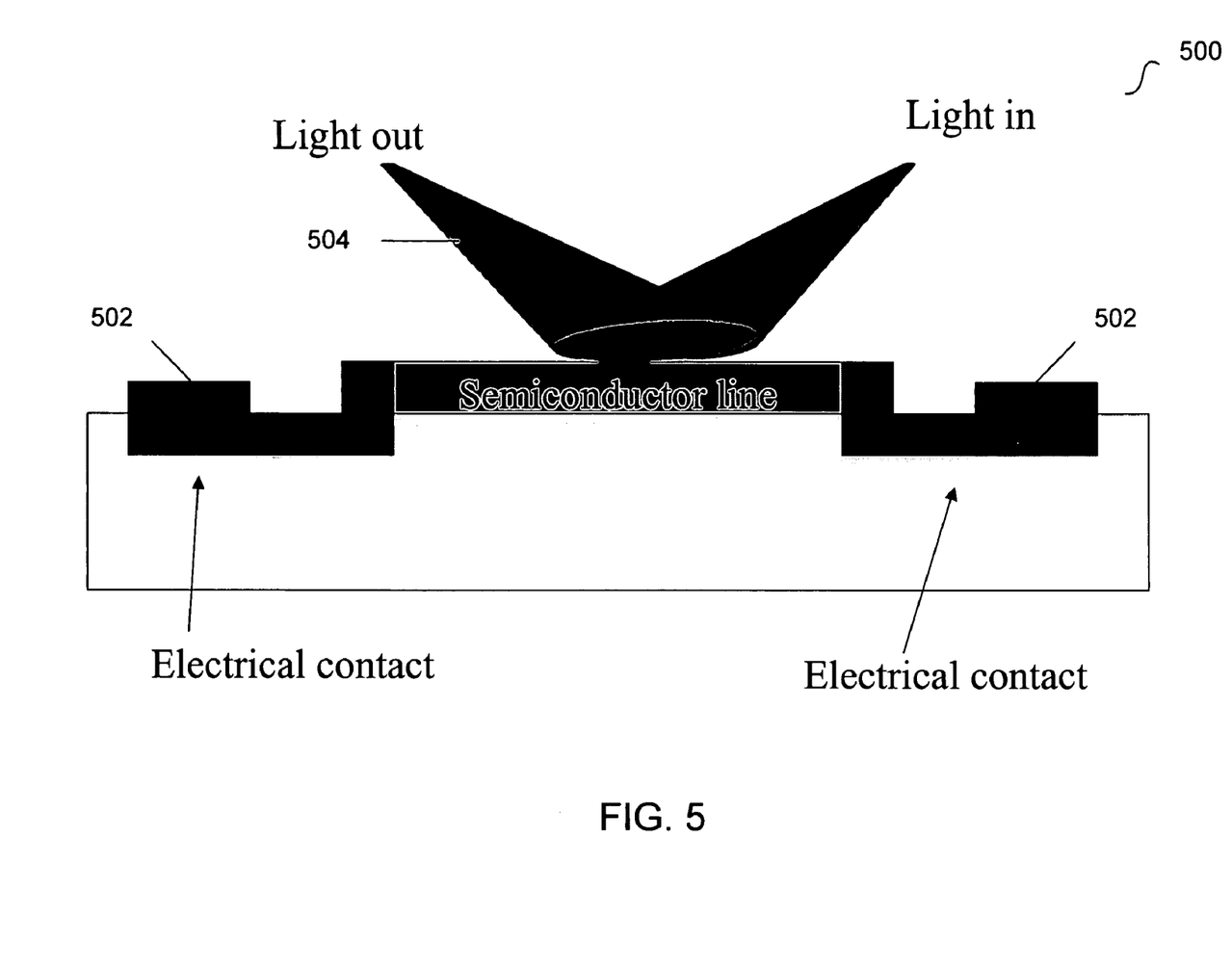
FIG. 5 is a system for determining electron mobilities of a semiconductor material, in accordance with embodiments of this disclosure.

As seen in Eq. 13, the electron mobility (and hence, the effective mass $m_x$, $m_y$, and $m_z$) is dependent on the electric field that the electrons experience. Thus, in one embodiment, a test structure may be used to change the electric field and thus the mobility. Referring to FIG. 5, test structure 500 may be used to measure electron mobility and may include metal contacts 502 connected to the ends of the lines or test structures such that a voltage can be applied across them. By measuring the same test structure at different electric fields, the mobility at different electric fields may be determined.

In one embodiment, in order to determine the electron mobility, a voltage may be applied to a test structure, similar to the one shown in FIG. 5, and polarized reflectivity or ellipsometry 504 may be measured using devices known in the art. This may continue as different voltages are applied to the test structure. Using Eq. 13, the critical point energy, $\omega_g$ may be determined, where the critical point energy is a function of the applied electric field. Next, the argument of the normalized Airy function and step function may be obtained. Using the argument, $\theta^3$ may be plotted as a function of the applied electric field, $E^{2/3}$. The slope of this plot, 1/u is the electron mobility across the test structure.

All of the methods and systems disclosed and claimed can be made and executed without undue experimentation in light of the present disclosure. While the methods of this invention have been described in terms of embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope, and concept of the disclosure as defined by the appended claims.

The invention claimed is:

1. A method for determining physical dimensions of at least one line of a plurality of lines on a semiconductor material comprising the steps of:
    illuminating the semiconductor material with an electromagnetic radiation source directed in a direction substantially parallel to the plurality of lines on the semiconductor material;
    obtaining a reflective light from the semiconductor material;
    determining a critical point data of the semiconductor material using the reflective light; and
    determining physical dimensions of at least one of the lines by using the critical point data and by using a solution to Schrödinger's equation with Cartesian coordinates.

2. The method of claim 1 the determining physical dimensions of at least one of the lines resulting in rectangular dimensions.

3. A method for determining physical dimensions of at least one line of a plurality of lines on a semiconductor material comprising the steps of:
    illuminating the semiconductor material with an electromagnetic radiation source directed in a direction substantially parallel to the plurality of lines of the semiconductor material;
    obtaining a reflective light from the semiconductor material;
    determining a critical point data of the semiconductor material using the reflective light; and
    determining physical dimensions of at least one of the lines by using the critical point data and by using a solution to Schrödinger's equation with polar coordinates.

4. The method of claim 3, the determining physical dimensions of at least one of the lines resulting in cylindrical dimensions.

5. A method for determining physical dimensions of at least one line of a plurality of lines on a semiconductor material comprising the steps of;
    illuminating the semiconductor material with an electromagnetic radiation source directed in a direction substantially parallel to the plurality of lines of the semiconductor material;
    obtaining a reflective light from the semiconductor material;

determining a critical point data of the semiconductor material using the reflective light;

generating a plurality of reflectivity curves by using a solution to Schrödinger's equation; and determining physical dimensions of at least one of the lines by using the critical point data.

6. The method of claim 5, further comprising storing the plurality of reflectivity curves in a library.

7. The method of claim 6, the step of determining physical dimensions further comprising comparing the critical point data to the plurality of reflectivity curves in the library.

* * * * *